Nov. 28, 1939.  A. C. VELO  2,181,471
AUTOMATIC GEAR SHIFT FOR VEHICLES
Filed Sept. 29, 1934  4 Sheets-Sheet 1

Inventor:
Anthony C. Velo,
By C. C. Hines,
Attorney.

Nov. 28, 1939.  A. C. VELO  2,181,471
AUTOMATIC GEAR SHIFT FOR VEHICLES
Filed Sept. 29, 1934  4 Sheets-Sheet 2
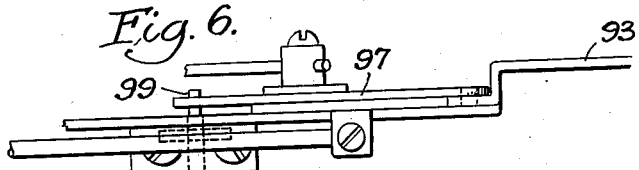
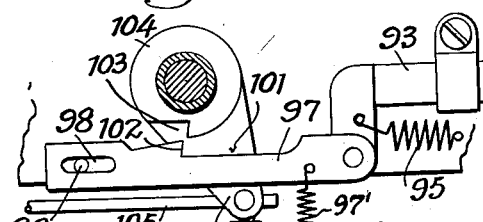
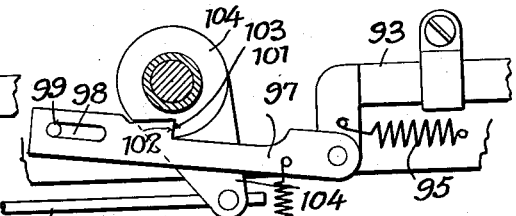
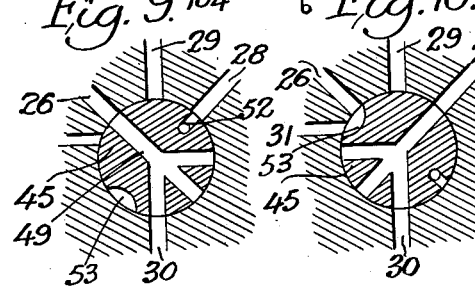
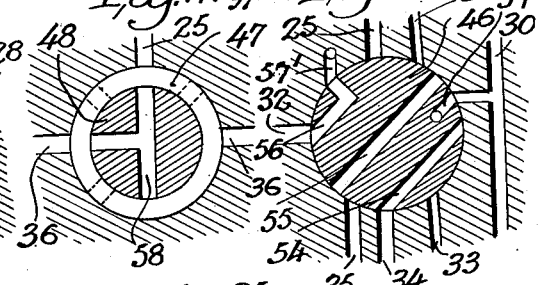
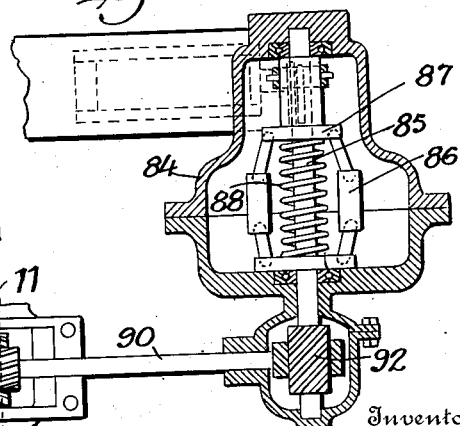
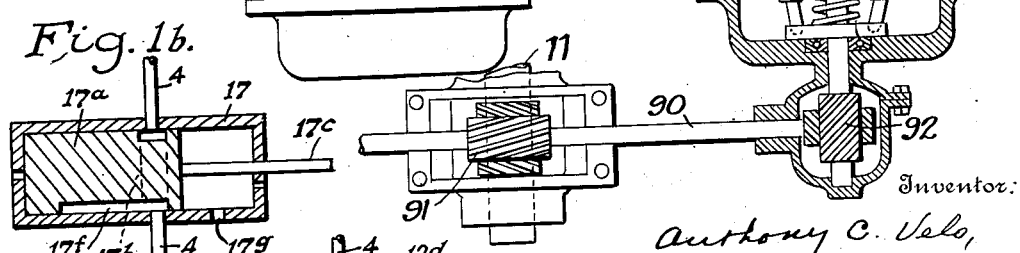
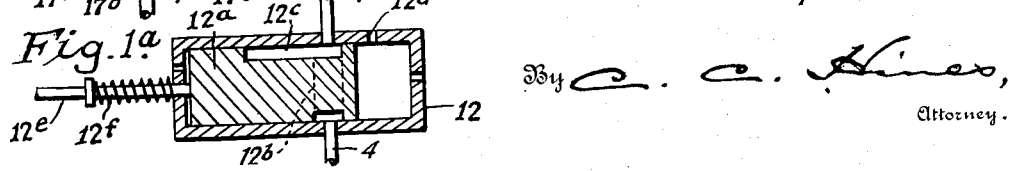
Inventor:
Anthony C. Velo,
By C. C. Hines,
Attorney.

Nov. 28, 1939.　　　A. C. VELO　　　2,181,471
AUTOMATIC GEAR SHIFT FOR VEHICLES
Filed Sept. 29, 1934　　　4 Sheets-Sheet 3

Inventor:
Anthony C. Velo.
By C. C. Hines,
Attorney.

Nov. 28, 1939.  A. C. VELO  2,181,471
AUTOMATIC GEAR SHIFT FOR VEHICLES
Filed Sept. 29, 1934  4 Sheets-Sheet 4
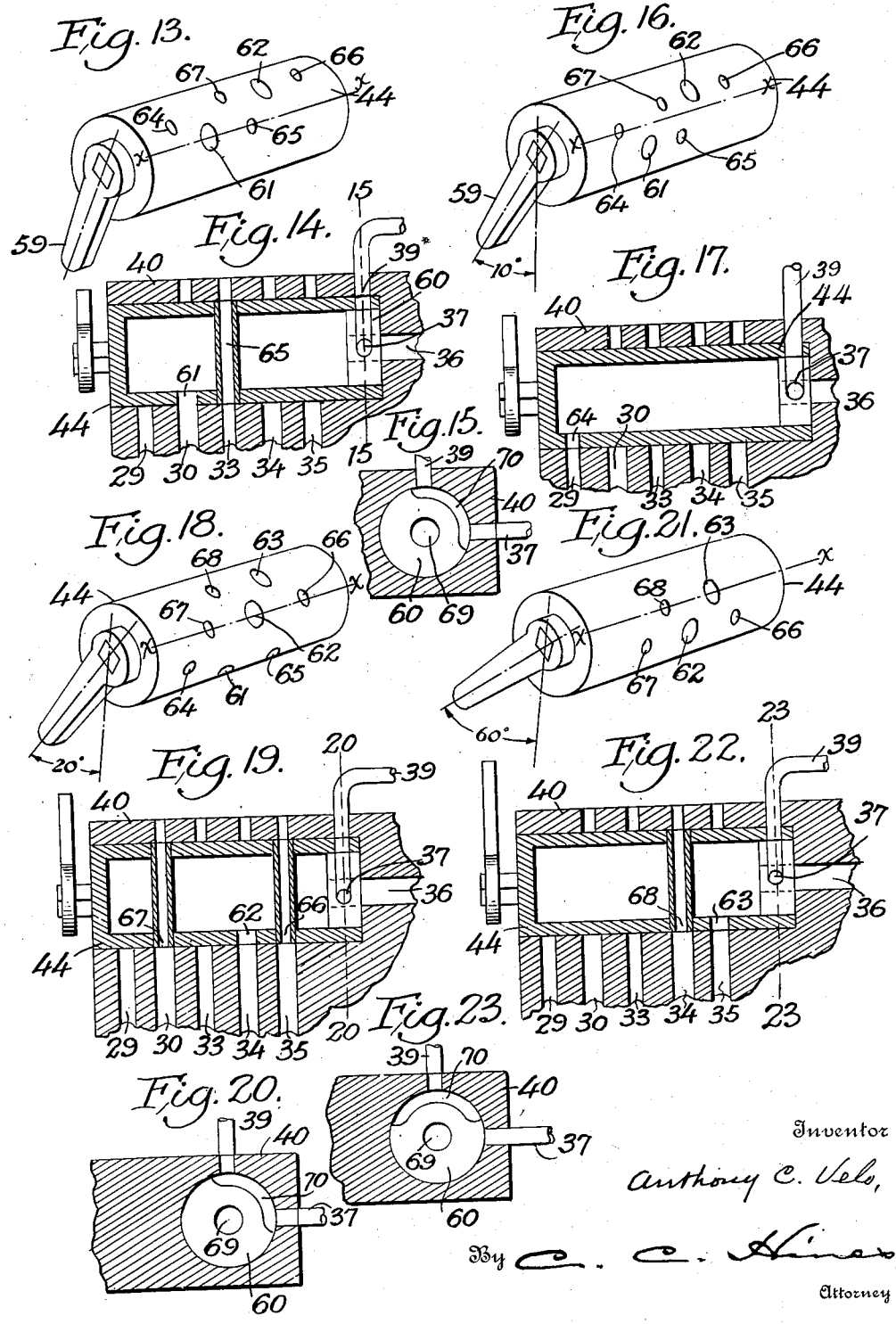

Patented Nov. 28, 1939

2,181,471

UNITED STATES PATENT OFFICE 2,181,471

AUTOMATIC GEAR SHIFT FOR VEHICLES

Anthony C. Velo, Lancaster, Pa., assignor, by direct and mesne assignments, to Vaco Products, Inc., a corporation of Delaware Application September 29, 1934, Serial No. 746,244

44 Claims. (Cl. 192—.01)

This invention relates to certain new and useful improvements in automatic gear shifts for automobiles and other auto vehicles, and particularly to improvements in automatic gear shifts of that type disclosed in my prior application for patent, filed April 21, 1934, Serial No. 721,777. In my said application Serial No. 721,777 I have shown a gear shift mechanism which is adapted to be operated by any suitable power means having as its origin or source of power the vehicle engine, but which is particularly designed and adapted to be actuated by pneumatic means operated by vacuum or compressed air power generated by the vehicle engine. In such gear shift mechanism as particularly disclosed in application Serial No. 721,777 the gear shift operating mechanism comprises a primary cylinder and piston for reverse and low speed gear shifts, a secondary cylinder and piston for intermediate and high speed gear shifts, a main conduit communicating with the source of fluid pressure and branch conduits for connecting the cylinders with said main conduit and the atmosphere, a selector valve controlling the supply of fluid to the primary cylinder for low speed or reverse gear shifts, a clutch valve controlling communication between the main conduit and the gear shift mechanism, a governor operated speed controlled valve controlling communication between the clutch operated valve in the main conduit and the branch conduits and between said branch conduits and the atmosphere, and a manually operable emergency valve controlling the flow of fluid to the secondary cylinder for shifting the piston therein when in high speed position to second speed position without regard to the position and action of the speed controlled governor valve.

One object of the present invention is to provide an improved construction, arrangement and working operation of and coaction between the governor valve, clutch controlled valve and emergency valve whereby greater efficiency and selectivity of operation of the valves may be obtained.

Another object of the present invention is to provide a novel construction of valves for an emergency valve action to effect a shift of the piston of the intermediate and third speed cylinder from high speed position to second speed position for a smooth and instantaneous emergency shift action without dependence for such action upon a particular position of and working action of the governor operated speed controlled valve.

A still further object of the invention is to provide gear shift mechanism adapted for use in conjunction with an automatic clutch, preferably of vacuum operated type and controlled in action by the accelerator pedal, and embodying means for automatically rendering the automatic clutch actuating device ineffective and inoperable for a clutch disengaging action by the accelerator when the vehicle is running in high gear and at a predetermined high speed, so as to avoid well known objections to the use of automatic clutches of this type and to give the driver maximum control of the vehicle and obviate excessive use of the clutch and brakes and wear and tear thereon.

A still further object of the invention is to provide locking means for locking the speed controlled governor valve in second speed position and from passing beyond second speed position in an accelerating direction until the vehicle has reached the proper speed for shift into high gear, thus ensuring certainty and positiveness of action in such shift from the intermediate to high speed, without liability of causing clashing of gears or injury thereto.

A still further object of the invention is to provide a novel construction of oscillatory governor controlled valve, and a governor for controlling the same, whereby greater simplicity of construction and efficiency of action of these working parts are obtained.

A still further object of the invention is to provide a gear shift mechanism combined for cooperation with an automatic clutch whereby gear shift actions are rendered entirely automatic throughout.

With these and other objects in view, which will appear in the course of the subjoined description, the invention consists of the novel features of construction, combination and arrangement of parts, hereinafter fully described and claimed, reference being had to the accompanying drawings, in which:

Fig. 1 is a diagrammatic view of an automatic gear shift and clutch mechanism embodying my invention conventionally showing the same as applied for use upon an automobile, the cover or head only of the transmission being shown.

Figs. 1a and 1b show suitable constructions of the valves 12 and 17.

Figs. 6, 7 and 8 are detail views of the means for locking the governor valve in second speed position.

Figs. 9 and 10 are views showing working positions of the selector valve.

Figs. 11 and 12 are views showing the working positions of the emergency second speed valves for the emergency shift action.

Figs. 13, 14 and 15 are views, Fig. 15 being a section on line 15—15 of Fig. 14, showing the governor valve in its neutral position.

Figs. 16 and 17 are views showing the governor valve in position to effect the shifting of the second speed gear to neutral position on the slowing down of the vehicle preparatory to coming to a stop so as to allow the primary piston to shift to first speed.

Figs. 18, 19 and 20 are views, Fig. 20 being a section on line 20—20 of Fig. 19, showing the governor valve in second speed position.

Figs. 21, 22 and 23 are views, Fig. 23 being a section on line 23—23 of Fig. 22, showing the governor valve in high speed position.

Figs. 24 and 25 are views illustrating the construction of the governor.

Figure 1:
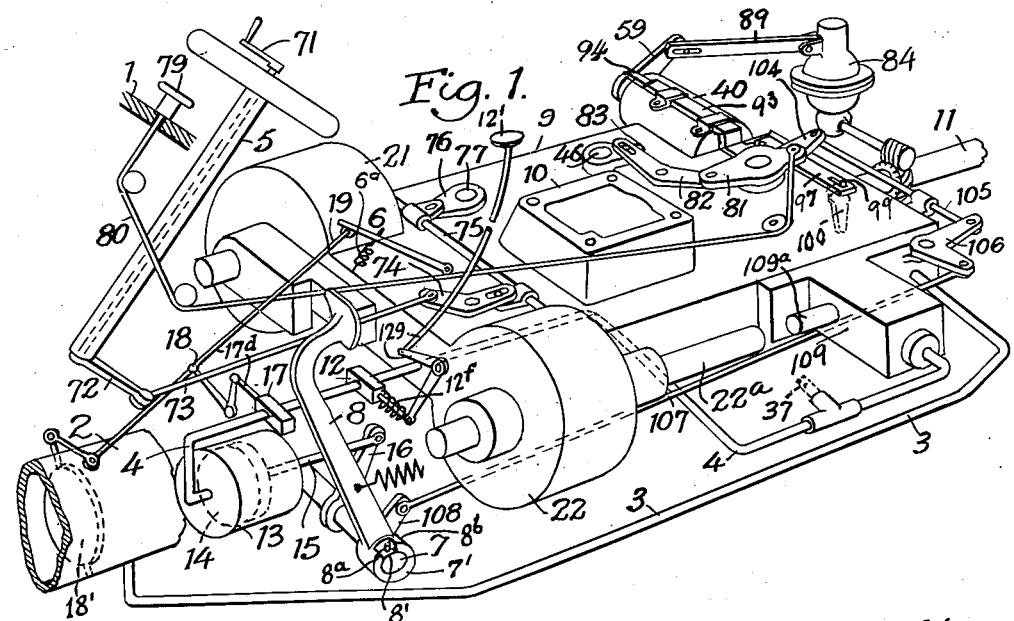

In the drawings I have shown my invention as constructed and designed, as disclosed in application 721,777, to employ as a power medium the suction or vacuum produced by the automobile engine, and using for this purpose suitable suction, pressure and relief passages or conduits connected with the intake manifold of the engine and the atmosphere, but it is to be understood that any other character of pneumatic or other suitable power means for supplying power produced directly or indirectly by the automobile engine may be employed. In the present instance I have also shown my invention as constructed and designed for use in conjunction with a vacuum operated automatic clutch for the purpose of making the gear shift mechanism entirely automatic in character, except as to initial starting or reverse actions or special service purposes, all operations being otherwise automatically performed as long as the vehicle is in course of travel; although it is to be understood that the invention may be used in connection with a clutch operated by compressed air or otherwise, or a manually operated clutch or a clutch which is normally automatically operated but may be manually operated whenever the automatic clutch operating means becomes inoperative from any cause. The invention may, furthermore, be designed and adapted for use in connection with a free-wheeling unit or not, according to the election of the automobile manufacturer or user, and may be suitably constructed for the use of a manually operable gear shift lever for shifting the gear shifters, as in the structure disclosed in my prior application Serial No. 614,573, whenever the automatic gear shifting means is rendered inoperative from any cause.

Referring now more particularly to the drawings, 1 designates the dash or footboard of an automobile, 2 the intake manifold of the internal combustion driving engine thereof, 3 and 4 portions of a suction conduit including a governor valve and certain passages coacting therewith, as hereinafter described, 5 the steering post assembly, 6 the accelerator, 7 the clutch operating shaft of a spring closed clutch (not shown), 8 the usual foot operated clutch pedal, 9 the head or cover of the automobile transmission, which may be of any ordinary or suitable type, 10 the mount for the gear shift when used, or for the mounting of any other suitable fixture, 11 the propeller shaft, and 12 a manually operated valve arranged in the suction conduit for throwing the gear shift mechanism and automatic clutch out of service whenever desired. The automatic pneumatic clutch actuating device which is shown for coaction with the gear shift mechanism may be of known vacuum operated type and is herein shown conventionally as comprising a working cylinder 13 connected with the suction conduit branch 4, a piston 14 operating in the cylinder and coupled by its stem or a connecting rod 15 to a clutch fork release lever 16, a control valve 17 for connecting the cylinder with and cutting off communication between the same and the suction conduit, and a linkage mechanism 18 for operating the valve 17 in unison with the throttle valve of the engine through an actuating member 19 engaged by the accelerator 6. The construction of the clutch assembly may be such as hereinafter described, as to adapt the clutch to be operated independently by the clutch pedal or automatic clutch actuating device. The construction of the clutch actuating device shown is or may be such that release of the accelerator will open the valve 17 to the suction conduit to effect a vacuum operation of the clutch to open position, while depression of the pedal will cause the valve 17 to close to cut off the vacuum and allow the clutch to be closed by its closing spring. The valve 12 may be a cut out valve operated manually through connection with a control button 12' or the like on the dash or a foot pedal or the like on the footboard for cutting the clutch actuating device either temporarily or permanently out of action when required. The clutch actuating device is arranged in the suction conduit in such manner that it may be permanently cut out of action if its use is not desired or whenever it is found unserviceable without interfering with the action of the automatic gear shift mechanism, as hereinafter fully described.

Figs. 1a and 1b show suitable constructions of the valves 12 and 17. The valve 12, as shown in Fig. 1a, comprises a casing interposed in the pipe 4 and having arranged therein a sliding valve member 12a having a passage 12b for connecting two portions or branches of the pipe 4 between which it is interposed when the valve is in its normally open position shown in Fig. 1a, said valve member being movable to a position in which it closes one branch of the pipe 4 and connects the other branch of the pipe 4 with the atmosphere through a passage 12c in the valve member and a port 12d in the valve casing. The valve member is provided with a stem 12e and a spring 12f acts thereon to normally maintain the valve in closed position. A suitable connection 12g is provided between the stem and the operating button 12' whereby the valve member may be moved to cut out position against the resistance of the spring.

The valve 17, as shown in Fig. 1b, is similar in construction to the valve 12 and comprises a casing interposed between two portions or branches of the pipe 4, in which casing a sliding valve member 17a having a passage 17b which, in the normal position of the valve, which corresponds with that of the accelerator pedal released, connects such pipe portions or branches, thus establishing communication between the pipe 4 and cylinder 13. The valve member is provided with a stem 17c coupled by a crank and link connection 17d to the accelerator, the return spring 6a of which also acts to normally maintain the valve member and accelerator in these relative positions. The valve member is movable from its end position shown in Fig. 1b to an opposite end position in the casing upon depression of the accelerator in which it cuts off communication between the pipe branches, and consequently between the suction source and the cylinder 13, and is provided with another passage 17f which in this cut off position of the valve member vents the cylinder 13 to the atmosphere through a port 17g in the valve casing.

The directly acting elements of the gear shift mechanism are preferably formed in or mounted upon the cover or head 9 of the gear shift housing so as to form therewith a gear shift power unit which may be mounted upon and removed as such from the housing. As shown, the sliding first and reverse and second and high gear shifter rods or bars 20 and 20' are mounted on the cover 9. On the cover are cast the body portions of two working cylinders 21 and 22, arranged at opposite sides and adjacent to one end thereof, said cylinders having respectively arranged therein pistons 21' and 22' respectively carried by sliding stems 21a and 22a. The cylinder 21 and its piston 21' effect the operation of the parts for reverse or first (low) speed shift, while cylinder 22 and its piston 22' effect the operation of the parts for a second or intermediate or third (high) speed shift. Motion is transmitted for these actions from the piston stems 21a, 22a to the shifters 20 and 20' through rocker arms or levers 21b, 22b pivotally supported on the cover member. The cylinders and pistons cooperate with channels, passages and ports, together with associated control valves, formed in the pistons and formed in and mounted upon the cover plate in a manner which I will now proceed to describe, whereby the automatic operation of the gear shift elements on the car is effected by power created by or having as its source the automobile engine.

Figure 2:
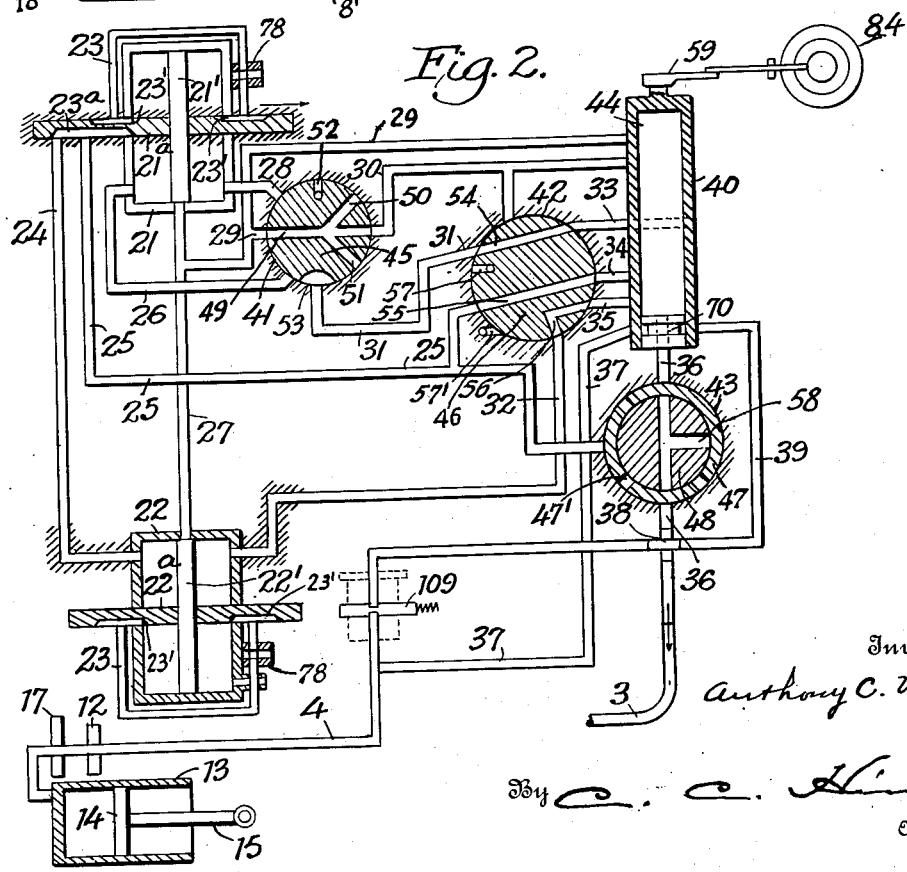
Fig. 2 is a plan diagram showing the layout of the ports, passages and working parts of the gear shift mechanism, with the working parts appearing in neutral position.

Formed in each working cylinder is a vent or relief passage 23 whose ends are located at opposite sides of the cylinder, and which ends of the passage cooperate respectively with vent ports 23' in the piston stems. In the piston stem 21a of the piston 21a is also a port 23a for coaction with passages 24, 25 which, together with passages 26 to 39, inclusive, are formed in the cover. The cover is also formed with a valve chamber 40 and valve cavities or recesses 41, 42, 43 in which are respectively mounted for operation an oscillatory speed controlled governor valve 44 and rotary valves 45, 46, 47, within which last-named valve is coaxially mounted a valve 48. Passages respectively 24 to 37, inclusive, are suction and vent passages controlling subatmospheric and atmospheric pressures to the working parts. The valve 45 is a selector valve which is mounted in the cavity 41 and is provided with a diametric port 49, opposite angle ports 50 and 51 intersecting one end of said port 49, and two vent or relief ports 52 and 53. It has a neutral position, as shown in Fig. 2, in which its ports 50, 51, 52 and 53 are blank and its port 49 communicates with the passages 29 and 30, and it has two opposite working positions, as shown in Figs. 9 and 10, respectively, for coaction with passages 26, 28 and 30 to control the gear shift mechanism through cylinder 21 and piston 21' for reverse or first speed forward driving actions. The valve 46 mounted in the cavity 42 is a secondary emergency by-pass valve provided for coaction with valve 48. This valve 46 has two diametric ports 54, 55, an angle port 56 and a vent or relief port 57 for coaction with the passages 31, 33, 25, 34, 32 and 35 and a vent port 57' in the cover 9. Said valve 46 has a normal position, as shown in Fig. 2, in which its ports communicate with the passages 31, 33, 25, 34 and 32, 35 and it has an emergency operating or by-pass position, as shown in Fig. 12, in which it closes communication between the passages 31, 33, 25, 34 and 32, 35 and connects passages 32, 35 with the atmosphere through vent 57 and a vent 57' in the cover 9. The valve 47 mounted in cavity 42 is a cylindrical clutch controlled switch valve having three radial ports 36 and 25 and a 47' for coaction with passages 36 and 25 and a T-shaped port 58 in the plug-like oscillatory valve 48 mounted to turn therein, which valve 48 is a primary emergency operating or by-pass valve operating in a by-pass action in conjunction with valve 46. Fig. 2 shows the normal position of the valve 48 and the position of the switch valve 47 when the clutch is in engaged position, in which position valve 47 closes communication between the main suction pipe 4 and the governor valve 44 and thus cuts off communication between the suction source and the transmission gear shift mechanism.

The valve 44 is a valve controlled by the speed of the vehicle to control the flow of fluid pressure to the power cylinders for gear shifting actions. It comprises a hollow barrel or cylinder having an integrally closed end carrying an actuating lever or crank arm 59 and having fitted within its opposite end a bushing 60. In the body wall of said valve are formed a series of three large main suction ports 61, 62 and 63 and a small auxiliary suction port 64, and the valve is provided with a series of four vent ports 65, 66, 67 and 68, the ports 61, 62 and 63 being adapted for cooperation respectively with the first, second and third speed lines 30, 34 and 35, and the port 64 with the passage 29, all for piston shifting movements, while the ports 65, 66, 67 and 68 are adapted respectively for vent actions in the piston shifting movements in coaction respectively with the passages 33, 35, 30 and 34. In addition the bushing part 60 of the valve is provided with an axial port 69 which constantly registers with the main suction passage 36 and a peripheral port 70 which controls communication between passages 39 and 37 for a clutch control action.

The valve 45 is adapted to be operated by a selector lever 71 on the steering post, which lever operates a shaft journaled in said post and carrying at its lower end a crank arm 72 coupled by a connecting rod 73 to one arm of a bell crank lever 74. The other arm of this lever is operatively coupled to a transversely disposed sliding shaft 75 which is connected to a crank 76 fixed to the stem 77 of the valve 45, whereby opposite swinging movements of the lever 74 under similar movements of the lever 71 will slide the rod 75 in opposite directions to transfer opposite rotary movements to the valve 45 for adjustment from the normal position shown in Fig. 2 to reverse gear or first speed gear position. The rod 75 is also operatively coupled to oscillating vent valves 78 controlling the vent or relief ports 23 of the cylinders 21 and 22, so as to properly connect the cylinders with the atmosphere for relief actions in the shifting of the piston 21' between neutral and reverse and first speed shifts. In the movements of the pistons venting actions are also afforded by the relief ports 23' and the passage 27 connecting the cylinders, so that under certain conditions a venting action may occur between cylinders through the passage 27, which is closed at its ends communicating with the respective cylinders by the pistons when the latter are in neutral position.

The valve 46 is adapted to be operated for an emergency action in conjunction with the valve 48 when the transmission is in high gear for a shunt operation or control of the fluid pressure to shift the gearing instantaneously into second speed, whenever required for hill climbing or other purposes, without the necessity of waiting for a drop in speed of the vehicle sufficient to effect the shifting of the transmission by the governor valve 44 into second speed under control of the governor. The means for operating the valves 46 and 48 comprises a hand or foot operated control member 79 on the dash or footboard which is connected by a rod or cable 80 with one arm of a lever 81 fixed on the stem of the valve 48, the other arm of which lever is coupled by a lever 82 to a crank 83 on the stem of the valve 46, whereby said valves may be shifted from their normal positions shown in Fig. 2 to emergency positions shown in Figs. 11 and 12, whereby a port 58 of valve 48 is closed to the suction line 36 and opened to suction line 25 and the valve 46 is adjusted for cooperation with the first and high speed vent passages for a second speed shifting operation. Upon the release of the control member 79 or its physical movement back to normal position the valves 48 and 46 will be restored to the normal position shown in Fig. 2, so that the gearing may be controlled for shift either into high or first speed.

The governor valve 44 is operated by a centrifugal governor 84 driven in practice by some suitable part of the drive mechanism of the vehicle on the driven side of the gear shift. This governor includes a rotary shaft 85, outwardly and inwardly movable centrifugally controlled governor weights or arms 86, and a sleeve 87 mounted to slide upon and rotate with the governor shaft, the sleeve being movable in a direction to maintain the valve 44 in initial or starting position by means of the governor spring 88 and movable in the direction to open the valve to progressively different degrees by the centrifugal action of the governor arms 86. As shown, the sleeve 87 is coupled to one arm of an intermediately pivoted motion transmitting lever 89, the other arm of which is operatively connected with the crank arm 59 on the valve. When the vehicle is standing still and the governor is at rest, the sleeve 87 is held by the spring 88 in position to maintain the valve 44 in the initial or starting position shown in Fig. 13. The governor is set into action as soon as the car is set into running motion and at a predetermined speed begins to turn the valve 44 in a clockwise direction. The range of movement of the valve under the action of the governor, as car speed increases, from the starting position shown in Figs. 13 and 14 to the second speed position shown in Figs. 18 and 19, may be through an arc of 20°, so as to bring the ports 62, 66 and 67 into register with the proper working suction and vent passages for the second gear shift, which may be under a range of the governor movement at any predetermined speed, say from six to eight miles an hour, at which time an automatic locking device is provided for locking the valve 44 in second speed position, as hereinafter described. From this position the valve 44 may move back to initial or starting position for shift from second to first speed as the speed of the vehicle decreases, and upon release of the locking device referred to the valve may be rotated further forward from the second speed position to the third speed position shown in Figs. 21 and 22 when the vehicle is traveling and the governor is operated at a speed suitable for shift of the gearing into third speed, say at a speed of from fifteen to eighteen miles an hour, in which operation the valve moves from initial position to an arc of about 60°, thus bringing ports 63 and 68 into position for coaction with the proper suction and vent passages for shift to third speed. The valve may be turned backward as the speed of the vehicle decreases for shifts to lower speeds, and for variable high and low speed actions in the running of the vehicle, subject to suitable control actions hereinafter fully described. In the structure disclosed the governor is driven from the propeller shaft through the action of an intermediate shaft 90 having a worm gear connection 91 with the propeller shaft and a similar gear connection 92 with the governor shaft. The governor may however be driven from any other part of the drive mechanism which is in constant action when the vehicle is running, so that the governor will always be influenced by vehicle speed instead of engine speed. The shaft 90 as disclosed in the present instance may be the speedometer drive shaft properly extended for driving engagement with the clutch. In order to enable the vehicle to be driven when in first gear at any desired speed, even at speeds in excess of the predetermined speed set for a second speed automatic shift, without movement of the valve 44 beyond second speed position, so that correct positioning of the valve for subsequent shift into second speed when desired will be ensured, I provide a second speed locking device for locking the valve 44 in second speed position and against movement beyond second speed position in a speed accelerating action when the vehicle is in first gear and until the clutch is positively opened for a second speed gear shift change. This locking device comprises a sliding stop bar 93 mounted on the cover 9 and carrying at one end a pivoted detent 94 normally held, by a spring 95 acting on the bar, in position to be engaged by the crank arm 59 of the valve 44. This detent 94 is free to swing in the direction of movement of the arm 59 until it assumes a stop position in which it engages a shoulder 96 on the bar 93 whereby its further movement is limited at the time when the arm 59 of the valve is in contact therewith at the moment the valve is in second speed position.

Figure 3:
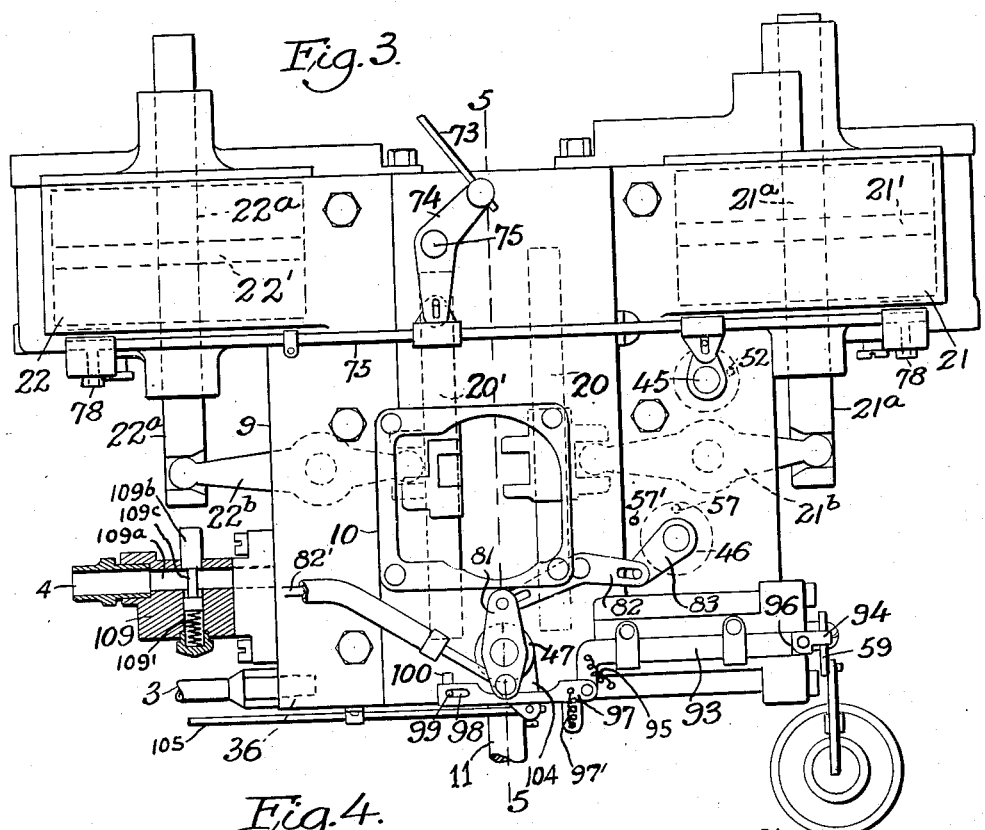
Fig. 3 is a plan view of the gear shift housing cover and elements of the gear shift mechanism applied thereto.
Figure 4:
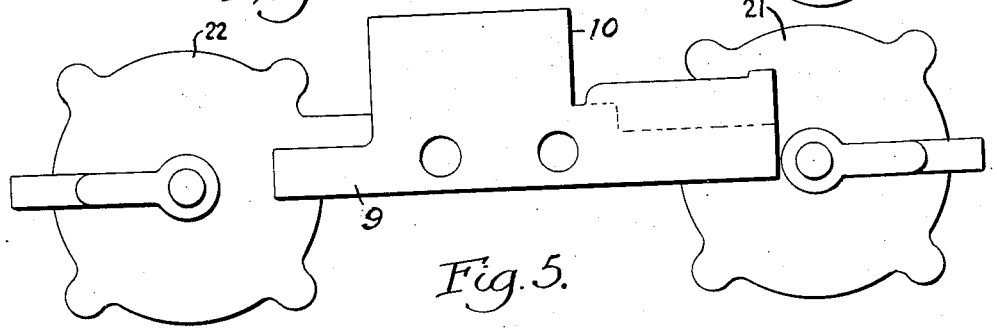
Fig. 4 is a rear end elevation of the same.
Figure 5:
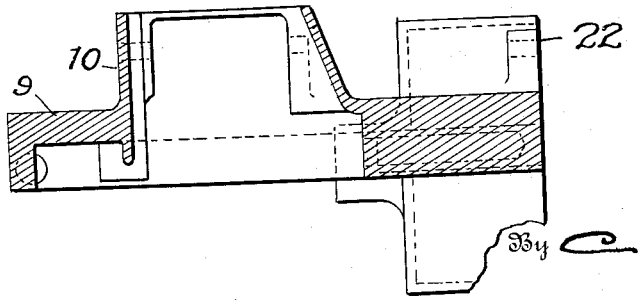
Fig. 5 is a detail section of a part of the housing cover.

When this position of the valve is reached the detent 94 will lie in the path of movement of the arm 59 and prevent movement of the valve beyond second speed position under the action of the governor irrespective of the rate of speed at which the vehicle is traveling. The detent 94, however, is free to swing in the reverse direction, after releasing the arm 59, as hereinafter described, to permit the valve to travel to first speed position, in order that the arm 59 in its return movement on a speed decreasing movement of the valve may trip past the detent. The bar 93 is connected at its opposite end to a coupling bar 97, which is pivoted at one end thereto, the opposite or free end of the bar 97 being normally held in a predetermined position by a spring 97' and is provided with a slot 98 receiving a pin 99 on the upper end of a pivotally mounted trip lever 100 arranged within the gear housing in the path of movement of the gear shifter rod or bar 20. The coupling bar 97 is provided in its inner face with a groove or recess 101 terminating at one end in a dog or shoulder 102 adapted for engagement with a tooth or recess 103 formed in the sleeve portion of a crank arm 104 mounted upon the valve 47, which arm 104 is coupled by a connecting rod 105 to a bell crank lever 106 which is in turn coupled by a connecting rod 107 to a crank arm 108 on the clutch shaft 7, whereby in the operation of the clutch valve 47 is opened to connect valve 44 with the suction line 3 and the tooth 103 engaged with tooth 102 to couple bar 97 with sleeve 104 for a detent releasing action. Fig. 3 shows the parts of the locking device in locking position in which detent 94 is engaged by the valve arm 59 to hold the valve 44 in second speed position. The bar 93 is normally maintained in this position by the action of its spring 95 to limit the movement of the valve 44 and prevent it from passing beyond second speed position normally at all times. It is to be understood that arms 16 and 108 may be fixed to the clutch operating shaft 7, on which the hub or sleeve 7' carrying the clutch pedal 8 is loosely mounted, and that said hub or sleeve may be provided with a cutout or recess receiving a lug or pin 8' on the shaft and forming shoulders 8a and 8b for coaction with said lug or pin whereby a connection is afforded to adapt the clutch shaft to be operated by the power operation of arm 16 or independently of the power means by manual depression of pedal 8, or any other suitable construction permitting independent operation of the clutch by the piston 13 and pedal 8 may be employed. The normal position of the parts of the coupling, when the transmission is in first or third gear, is that shown in Fig. 7, which also shows the position of the latch bar and parts when the clutch is disengaged.

With the parts in this position the valve 47 may be actuated by and with the clutch without movement of the latch bar 93 out of locking position as the coupling bar 97 is free from connection with the notched collar of the crank arm 104. With the valve in second speed position, therefore, the clutch may be opened and valve 47 actuated for the second speed gear shift, and in the operation of the shifter rod 20' to second speed position this rod will engage the lever 100 and through movement of the pin 99 shift the toothed end of the bar 97 into engagement with the tooth or notch 103, thus coupling the bar 93 through the parts 97 and 104 to the rod 105 so that when the clutch is operated for a third speed gear shift the rod 105 will be drawn upon to communicate motion through the crank arm 104 to slide the bar 93 to a retracted position, in which the stop 94 is moved out of the path of the crank arm 59, thereby allowing the valve 44 to move forward to third speed position. Upon the closing of the clutch and movement of the rod 105 back to normal position the parts 97 and 104 will be restored to the position shown in Fig. 7, thus uncoupling said parts and disconnecting the bar 93 from coupling connection with the rod 105 so that the bar 93 will return to normal position by the action of its spring 95, thus resetting the stop member or detent 94 for further action when the valve 44 again moves back beyond second speed position. On the backward movement of the crank arm 59 in the back travel of the valve 44 from high speed to second speed position the arm 59 will engage the detent 94 without effect thereon, as the detent will swing back to allow the crank arm to pass. By this means greater latitude of control over the gear shift mechanism and the vehicle is provided, as the vehicle may be driven in low gear at any speed desired, as, while the valve 44 may in such a speed action travel to an advanced position as far as second speed position, it will be positively locked in such position and maintained in such position until the driver desires to shift, by manipulation of the clutch, into second gear. Other advantages resulting from the use of this second speed lock device will be readily understood and appreciated by those versed in the art.

A valve 109 operated by the gear shift power mechanism is provided in that part of the suction conduit leading to the clutch cylinder for rendering the clutch inoperable by the vacuum when the transmission is in high gear, the action of which valve 109 is nullified by the valve 44 when the vehicle speed drops to a point where shift from high to second gear is necessary, so as to make the clutch action automatic and so as to avoid the necessity of a manual clutch shift in a translation from high to second gear. The valve 109 comprises a casing having a passage 109a controlled by a sliding valve member 109b normally held in the open position shown in Fig. 3 by a spring 109'. The valve member is provided with a reduced or cut away portion 109c registering with said passage when the valve is in open position. The spring 109' is disposed between the casing and one end of the valve, and the other end of the valve projects outwardly from the casing and lies in the path of movement of stem 22a of piston 22'. The latter-named end of the valve is thus arranged to be engaged by the piston stem 22a to move the valve to closed position when the piston 22' is moved to third speed position, thus closing communication between the suction source and the clutch. Communication between the suction source and valve 44 is also closed by the valve 47 through the passage 36 while the clutch is closed, but in the event that the speed of the vehicle, while the transmission is in high gear should descend to a point where shift to second gear is necessary, say eight miles per hour, the valve 44 in moving backward at the reduced speed will, at the predetermined reduced speed point, bring the port 70 therein from the high speed position shown in Fig. 23 to the second speed position shown in Fig. 20. By this means, as shown in Fig. 20, a by-pass connection is provided via passage 39, port 70 and passage 37 to open up communication between the suction source 3 and the cylinder 13 to effect an automatic release of the clutch and opening of the valve 47 to connect the valve 44 with the suction source for an automatic shift of the gearing from high to second gear.

The construction and general working action of the parts having thus been described, and which will be readily understood in connection with the drawings, I will now proceed to describe the working actions in making the gear shifts.

*The reverse gear shift.*—Selector valve 45 is moved by lever 71 to the reverse position shown in Fig. 9, and accelerator 6 is released to open the clutch. The valve 45 thereby opens communication between channels 30 and 26, thus connecting the reverse side of cylinder 21 with the vacuum source 3 through valve 44, thereby shifting piston 21' to operate shifter bar 20 for the reverse gear shift. At this time a vent from the first speed side of the piston is provided through passage 28 and port 52 for admission of atmospheric air thereto. At this time valve 44 is in its starting position shown in Figs. 13 and 14 in which connection with passage 36 is afforded through suction port 61 and a vent action is afforded through passage 33 and port 65. Then upon pressing the accelerator pedal the clutch will be engaged for travel of the car backward. To restore normal conditions the selector valve 45 is returned to neutral position and the piston 21' will be returned to neutral position by suction through passages 29 and 30 and a vent will be provided through the opening of the associated vent valve 77.

*The first speed gear shift.*—Selector valve 45 is moved by lever 71 to first speed position shown in Fig. 10 and the accelerator released to open the clutch. The valve 45 thereby opens communication between the suction source 3 and channels 30 and 28 to the first speed side of cylinder 21, thus pulling piston 21' to first speed position to operate shifter bar 20 for the first gear shift. At this time a vent from the reverse side of the cylinder 21 will be provided through passages 26 and 31 and valve port 53 for admission of atmospheric air thereto. At this time valve 44 is in the same position for the reverse gear shift previously explained for similar suction and vent actions. Then upon pressing the accelerator pedal the clutch will be engaged and the car put in forward motion.

*The second speed gear shift.*—When the car starts running in first gear the governor is set into action to operate the valve 44. At approximately six to eight miles per hour the valve 44 will be moved by the governor to the position shown in Figs. 18 and 19, thus bringing suction port 62 in communication with passage 34 and vent ports 66 and 67 with passages 30 and 35. At this time piston 21' being in first speed position a suction action will be established through passage 25 and port 23a in the piston rod in the reverse side of cylinder 21 to shift piston 21' to neutral position, a vent to the opposite side of the cylinder being established through port 67 and passage 30. Upon the return of the piston 21' to neutral position communication between passage 25 and cylinder 21 through port 23a will be cut off and port 23a will connect passage 25 with passage 24, thus establishing a suction pull in the second speed side of cylinder 22 to move the piston 22' and shifter bar 20' to second speed gear shift position. In this operation a vent for the opposite side of the cylinder will be provided through passage 35 and port 66 in valve 44. Upon depression of the accelerator pedal the clutch will be engaged with the transmission in second gear.

*The high speed gear shift.*—When the car is traveling at a speed of from fifteen to eighteen miles per hour, the valve 44 will have been moved by the governor to the limit of its forward travel or third speed position shown in Figs. 21 and 22. The speed is now suitable to put the car in high gear. Upon the release of the accelerator pedal the clutch will be opened and as ports 63 and 68 in valve 44 register with passages 35 and 34a suction will be established in the high speed side of cylinder 22 to move the piston 22' and shifter rod 20' to high speed shift position. A vent from the opposite side of the cylinder will at the same time be provided through passages 24, 25 and 34. Upon depression of the accelerator pedal the clutch will be closed for travel of the car in high speed.

*The emergency second speed control.*—With the car traveling in high gear it is desirable at times for hill climbing or other purposes to put the car instantaneously into second gear without waiting until a drop in the speed of the car causes a shift of the valve 44 by the governor to second speed position. To effect this the means previously described consisting of levers 83 and 81 on the valves 46 and 48, connected by a lever 82, are provided and operated by a rod or cable 80 from the control device 79 located on the dash or footboard whereby said valves may be shifted to the emergency positions shown in Figs. 11 and 12. In these positions of the valves valve 48 is disposed to open communication through port 58 to passages 36 and 25 through one of the ports 47' in valve 47 when the clutch is opened in the automatic clutch action previously described, thus establishing a suction in cylinder 22 to shift piston 22' to second speed position, while valve 46 will close communication between the valve 44 and the cylinders and open a vent between the third speed side of cylinder 22 through channel 32 and vent port 57' and the atmosphere. To return to high speed the valves 46 and 48 are returned to normal position, thus effecting an immediate return of piston 22' to high speed position.

*Shift from high to second speed.*—The shift from high to second gear in the normal way, through the slowing down of the car, is effected in the reverse way to that described for the second to high shift.

*Shift from second to first speed.*—When the car is running at a speed of from two to three miles per hour and is still slowing down valve 44 will move to the position shown in Figs. 16 and 17, opening communication between its suction port 64 and passage 29 to the neutral passage 27, so that the piston 22' will be shifted from second speed to neutral, so that when the car approaches or comes to a standstill the shift mechanism will be in condition to be shifted into first speed again.

The various acions which occur for special purposes or under special conditions having been previously described, a repetition thereof is unnecessary.

It will, of course, be understood that any suitable source of fluid pressure for operating the clutch and gear shift members may be employed.

From the foregoing description, taken in connection with the drawings, the construction and mode of operation of the invention will be readily understood by those versed in the art without a further and extended description, and it will be seen that the invention provides simple, reliable and efficient means for the purpose which, while sufficiently automatic in action, gives the driver complete control over the shifting mechanism, clutch and the car. While the structure disclosed for the purposes is preferred, it will further be understood that changes in the form, construction and arrangement of parts may be made within the scope of the appended claims without departing from the spirit or sacrificing any of the advantages of the invention.

What I claim is:

1. In a vehicle driving mechanism, a fluent power supply system, a variable gear shift, a clutch, a fluent power operated operating means for the clutch, a manually operable device governing the power operation of the clutch operating means for effecting clutch engaging and releasing actions, and a power let on and cut off device directly controlling the power operation of the clutch operating means, said device being arranged in the path of movement of a moving part of the gear shift so as to be operated thereby for cutting off the power operation of the clutch operating means and rendering the clutch inoperable for a releasing action by said device when the gear shift is in high gear.

2. In a vehicle driving mechanism, a variable gear shift, a clutch, a fluid pressure actuated operating means for the clutch, a manually operable device governing the fluid pressure operation of the clutch operating means for effecting clutch engaging and releasing actions, and a valve directly controlling the power operation of the clutch operating means, said valve being arranged in the path of movement of a moving part of the gear shift so as to be operated thereby for fluid pressure operation of the clutch operating means and rendering the clutch inoperative for a releasing action by said device when the gear shift is in high gear.

3. In a vehicle driving mechanism, a gear shift, fluid pressure power means for operating the same, a speed controlled means governing the fluid pressure operation of the power means for operating the gear shift to effect normal gear shift actions at different vehicle speeds, and means for controlling the fluid pressure operation of the gear shift power means independent of the speed controlled means for operating the gear shift to effect a shift to an intermediate speed gear when the gear shift is in high gear.

4. In a vehicle driving mechanism, a gear shift, a fluid pressure operated means for actuating the gear shift, a clutch, fluid pressure operated means for actuating the clutch, means for controlling the fluid pressure operation of the clutch actuating means, a valve responsive to vehicle movement governing the fluid pressure operation of the gear shift actuating means for effecting of normal gear shift actions at different vehicle speeds, and means for controlling the fluid pressure operation of the gear shift actuating means independent of the vehicle movement controlled valve to effect a shift of the gearing to a lower speed gear when the gear shift is in high gear.

5. In a vehicle driving mechanism, a power operated variable speed gear, a clutch, a device responsive to vehicle movement controlling the power operation of the gear for speed changes, means for limiting the movement of the vehicle movement controlled device to second speed position in a speed accelerating action, and clutch controlled means for rendering said limiting means ineffective and permitting movement of said device to a higher speed position on actuation of the clutch for a higher speed shift.

6. In a vehicle driving mechanism, a power operated gear shifter, a control device responsive to vehicle movement governing the power operation of the gear shifter for effecting normal gear shift actions, means for limiting the movement of said device in one direction to a point below that for effecting change from intermediate to high gear, a clutch, and means actuated by the clutch for nullifying the action of said limiting means to allow the control device to move to high gear shift position.

7. In a vehicle driving mechanism, a fluid pressure operated variable gear shift embodying a motor cylinder and piston for effecting reverse and first gear shifts and a motor cylinder and piston for effecting second and high speed gear shifts, a clutch, fluid pressure operated means for actuating the clutch, a manually operable device controlling the fluid pressure operation of the clutch actuating means for clutch engaging and releasing actions, and an automatically opening valve lying in the path of movement of the high gear piston into high gear position and directly closed thereby on such piston movement for rendering the clutch actuating means inoperable by said device, said valve being released for movement to open position on movement of the piston out of high gear position to render the clutch actuating means operable by said device.

8. In a vehicle driving mechanism, a gear shift, fluid pressure operated means for actuating the gear shift, a clutch, fluid pressure means for actuating the clutch, a speed controlled valve governing the fluid pressure operation of the gear shift actuating means for normal shifting actions, a manually operable device controlling the fluid pressure operation of the clutch actuating means for clutch engaging and releasing means, means operated by the gear shift when the gear shift moves into third gear for rendering the clutch inoperable by its actuating means, and controlling means operable for controlling the fluid pressure operation of the gear shift actuating means for effecting an immedate shift action from third gear to a lower gear without regard to the control action of the speed controlled valve and simultaneously rendering effective fluid pressure control of the clutch actuating means under control of the manually operable device.

9. In a vehicle driving mechanism, a gear shift, a fluid pressure operated means for actuating the gear shift, a clutch, fluid pressure operated means for actuating the clutch, means for controlling the fluid pressure operation of the clutch actuating means, a speed controlled valve governing the fluid pressure operation of the gear shift actuating means for effecting normal gear shift actions at different vehicle speeds, and clutch controlled means for controlling the fluid pressure operation of the gear shift actuating means independent of the speed controlled valve for a shift of the gearing to an intermediate speed gear when the gear shift is in high gear.

10. In a vehicle driving mechanism, a gear shift, a fluid pressure actuated means for actuating the gear shift, a clutch, fluid pressure operated means for actuating the clutch, a variable speed controlled valve controlling the fluid pressure operation of the gear shift actuating means for effecting normal variable speed shifts at different vehicle speeds, a device for controlling the fluid pressure operation of the clutch actuating means, means operative to render the clutch actuating means inoperable by said device when the gear shift is in high gear, and means operable when the gear shift is in high gear for controlling the fluid pressure operation of the gear shift actuating means for shift action from high to second gear independent of the action of the speed controlled valve for simultaneously rendering effective fluid pressure control of the clutch actuating means to render the clutch actuable by its actuating means under control of the clutch actuating device.

11. In a vehicle driving mechanism, a gear shift, fluid pressure operated means for actuating the gear shift, a clutch, fluid pressure operated means for actuating the clutch, valve means for selectively governing the fluid pressure operation of the gear shift actuating means for effecting normal gear shift actions at different vehicle speeds, a manually operable device for controlling the fluid pressure operation of the clutch actuating means for clutch engaging and releasing actions, a cut off device movable to a position when the gear shift is in high gear for rendering effective the fluid pressure operation of the clutch actuating means, and a by-pass means operable when said cut off device is in such position for controlling the fluid pressure operation of the gear shift actuating means for effecting a shift change from high to an intermediate gear and for simultaneously establishing a connection whereby fluid pressure operation of the clutch actuating means may be effected to disengage the clutch.

12. In a vehicle driving mechanism, a gear shift, fluid pressure operated means for actuating the gear shift, a clutch, fluid pressure actuated means for actuating the clutch, a speed controlled valve governing the fluid pressure operation of the gear shift actuating means for effecting normal gear shift actions at different vehicle speeds, a device controlling the fluid pressure operation of the clutch actuating means for clutch engaging and releasing actions, a valve controlled by a moving part of the gear shift for rendering ineffective or effective fluid pressure operation of the clutch actuating means when the gear shift moves into and out of high speed, and means for effecting fluid pressure operation of the gear shift actuating means for shift from high to an intermediate gear independent of the speed controlled valve.

13. In a vehicle driving mechanism, a pneumatically operated gear shift, a pneumatically operated clutch, pneumatic means for operating the gear shift and clutch, a valve governed in action by different vehicle speeds for controlling the pneumatic operation of the gear shift operating means for effecting normal gear shift actions, a manually operable device governing the pneumatic operation of clutch operating means for effecting clutch engaging and releasing actions, means operable when the gear shift is in high gear for preventing operation of the clutch operating means, and emergency valves movable in cooperation to control the pneumatic operation of the gear shift operating means for effecting a shift action from high to an intermediate speed independent of the speed controlled valve.

14. In a vehicle driving mechanism, a gear shift, fluid pressure operated means for actuating the gear shift embodying a reverse and low gear cylinder and piston and a second and high gear cylinder and piston, a speed controlled valve governing the fluid pressure operation of said cylinders and pistons, a clutch, fluid pressure operated means for actuating the clutch, a manually operable device governing the fluid pressure operation of the clutch actuating means for clutch engaging and releasing actions, a valve operable by the piston of the third and high speed gear for preventing fluid pressure operation of the clutch actuating means when the gear shift is in high gear, an emergency valve operable independently of the speed controlled valve to a position for establishing flow connections with the second and high gear cylinder for effecting a pneumatic shift of the gearing from high to second gear, and a second valve operating in conjunction with the emergency valve for establishing flow connections with the second and high gear cylinder for effecting a pneumatic shift of the gearing from high gear to second gear in such position of the emergency valve.

15. In a vehicle driving mechanism, a power operated variable speed gear, a clutch, a device controlled by movement of the vehicle for governing the power operation of the gear for variable speed changes, means for limiting the movement of said device to intermediate speed position in a speed accelerating action, and clutch controlled means for rendering said limiting means ineffective and permitting movement of said device to a higher speed position on actuation of the clutch for a speed shift.

16. In a vehicle driving mechanism, a pneumatically operated gear shifter, a valve controlled by movement of the vehicle to govern the pneumatic operation of the gear shifter for effecting different gear changes, means for limiting the movement of the valve in one direction to a point below that for effecting change from intermediate to high gear, and means for nullifying the action of the aforesaid means to allow the valve to move to high gear shift position.

17. In a vehicle driving mechanism, a pneumatically operated gear shifter, a valve controlled by movement of the vehicle to govern the pneumatic operation of the gear shifter for effecting different gear changes, means for limiting the movement of the valve in one direction to a point below that for effecting change from intermediate to high gear, a clutch, and means actuated by the clutch for nullifying the action of the aforesaid means to allow the valve to move to high gear shift position.

18. In a vehicle driving mechanism, a fluid pressure operated gear shifter, a valve movable to control the fluid pressure operation of the gear shifter for effecting gear changes responsive to vehicle speed increasing actions, means operative to stop and prevent the speed increasing movement of the valve beyond second speed position, a clutch, releasing means operative by the clutch for throwing said stop means out of action, and means operative on actuation of the clutch to couple the stop means to said releasing means.

19. In a vehicle driving mechanism, a fluid pressure operated gear shifter including a device for shifting gears for high and intermediate speeds, a speed controlled valve governing the fluid pressure operation of the gear shift for effecting gear shifting actions at different speeds, a stop for arresting the movement of said valve in speed increasing direction beyond second speed position, while permitting movement of said valve in both directions in other speed changes, a releasing member for shifting the stop to releasing position, and coupling means controlled by the movements of said shifting device for connecting the stop member with and disconnecting it from the releasing member.

20. In a vehicle driving mechanism, a fluid pressure operated gear shifter including a member for effecting second and high gear shifts, a speed controlled valve governing the fluid pressure operation of the gear shifter for effecting speed changes at different vehicle speeds, a pivotally mounted stop member shiftable into a position for arresting the movement of said valve in speed increasing direction when in second speed position while permitting of other speed changing movements thereof, a clutch, a releasing element operated by the clutch, a coupling element actuated by the releasing element, and a coacting coupling element thrown into and out of action by the second and high gear shifting member of the gear shifter for connecting the stop member with and disconnecting it from the releasing element.

21. In a vehicle driving mechanism, a fluid pressure operated gear shift, a fluid pressure operated clutch, means for controlling the fluid pressure operation of the clutch for clutch engaging and disengaging actions, a speed controlled valve governing the fluid pressure operation of the gear shift for effecting normal gear shift actions at different vehicle speeds, a selector valve governing the fluid pressure operation of the gear shift for effecting reverse and first speed gear shift actions, and means for controlling the fluid pressure operation of the gear shift independent of the speed controlled valve for effecting shift to an intermediate speed gear when the gear shift is in high gear.

22. In a vehicle driving mechanism, a fluid pressure operated gear shift, a fluid pressure operated clutch, valve means for selectively controlling the fluid pressure operation of the gear shift for effecting normal variable speed shifts between first and higher speed shifts at different vehicle speeds, a selector valve governing the fluid pressure operation of the gear shift for effecting reverse and first speed gear shift actions, a device for controlling the fluid pressure operation of the clutch for clutch engaging and disengaging actions, a cut out device for preventing fluid pressure operation of the clutch when the gear shift is in high gear, and means operable without regard to the control of said valve means and during a cut off action of said cut off device for controlling the fluid pressure operation of the gear shift when the gear shift is in high gear for effecting a shift change from high to second gear and simultaneously rendering the clutch actuable by its fluid pressure operating means.

23. In a vehicle driving mechanism, a fluid pressure operated gear shift, a fluid pressure operated clutch, a speed controlled valve governing the fluid pressure operation of the gear shift for effecting normal gear shift actions at different vehicle speeds, a selector valve governing the fluid pressure operation of the gear shift for effecting reverse and first speed gear shift actions, a manually operable device for controlling the fluid pressure operation of the clutch for effecting clutch engaging and releasing actions, a cut out device operable when the gear shift is in high gear for preventing fluid pressure operation of the clutch, and a by-pass means operable when the gear shift is in high gear for varying the fluid pressure operation of the gear shift for effecting a shift from high to an intermediate gear and simultaneously rendering the clutch operable by its fluid pressure operating means.

24. In a vehicle driving mechanism, a fluid pressure operated gear shift, a fluid pressure operated clutch, a speed controlled valve governing the fluid pressure operation of the gear shift for effecting normal gear shift actions at different vehicle speeds, a selector valve governing the fluid operation of the gear shift for effecting reverse and first speed gear shift actions, a device controlling the fluid pressure operation of the clutch for effecting clutch engaging and releasing actions, a valve controlled by a moving part of the gear shift for preventing or admitting fluid pressure operation of the clutch when the gear shift moves into and out of high speed respectively, and means for effecting fluid pressure operation of the gear shift for obtaining a shift from high to an intermediate gear independent of the speed controlled valve.

25. In a vehicle driving mechanism, a variable gear shift, power means for operating the same, means controlling the application of power to the gear shift to effect selective shift changes, a clutch, power means for operating the clutch, a manually controlled control device for controlling the application of power to the clutch operating means for operating the clutch, an automatic device independent of said control device and operative in gear shift actions for cutting off and letting on the power to the clutch operating means respectively on shift of the gear shift from intermediate to high gear and vice versa, a by-pass for by-passing power to the clutch operating means about said automatic device, and means for governing said by-pass to supply power to the clutch operating means when the gearing is in high gear and the automatic device is in cut out position.

26. In a vehicle driving mechanism, a power operated variable gear shift embodying a fluid pressure operated power device for reverse and first gear shifts and a fluid pressure operated power device for second and high speed gear shifts, means for controlling the fluid pressure operation of said power devices for effecting shift changes, each of said devices including a movable fluid pressure operated power transmitting member, a clutch, power means for operating the clutch, a control device governing the power operation of the clutch operating means for effecting clutch engaging and releasing actions, and means thrown into and out of action by the movable fluid pressure operated power transmitting member of the second and high gear power device for rendering the clutch operating means invice for rendering the clutch operating means invice operable and operable respectively by said device on movements of said power device respectively into and out of high gear shift positions.

27. In a vehicle driving mechanism, a fluid pressure operated gear shift embodying shiftable gears and gear shifting elements, valve means controlled by movement of the vehicle and governing the fluid pressure operation of the gear shift to effect normal gear shift movements of said shifting elements at different vehicle speeds, and means shiftable independently of said valve means for controlling the fluid pressure operation of the gear shift for effecting a shift to a gear ratio other than that determined by said valve means in a particular shift determining position thereof.

28. In a gear shift mechanism, the combination of a variable gear shift, power means for operating the gear shift including a movable motor member, means controlling the power operation of the gear shift operating means for operating the gear shift to effect selective speed changes, a clutch, power means for operating the clutch, a control device for controlling the power operation of the clutch operating means, a power cut off and let on device movable in the movements of said movable motor member in gear shift changes from intermediate to high gear and high gear to intermediate gear for respectively throwing the clutch power control device into and out of action, and an emergency control device operable when the gear shift is in high gear to arbitrarily control the power operation of the gear shift operating means for operating the gear shift to effect a shift from high gear to intermediate gear and to thereby simultaneously effect movement of the power cut off and let on device to let on position so as to render the clutch power control device effective for controlling the clutch operating means.

29. In a gear shift mechanism, the combination of a variable gear shift, power means for operating the gear shift including a movable motor member, means controlling the power to the gear shift operating means for operating the gear shift to effect selective speed changes, a clutch, power means for operating the clutch, a control device for controlling the power operation of the clutch operating means, a power cut off and let on device movable in the movements of said movable motor member in gear shift changes from intermediate to high gear and high gear to intermediate gear for respectively throwing the clutch operating means into and out of action and rendering the clutch power control device ineffective and effective for power controlling actions, an emergency control device operable when the gear shift is in high gear to arbitrarily control the power operation of the gear shift for a shift from high gear to intermediate gear and to simultaneously effect movement of the power cut off and let on device to let on position so as to render the clutch power control device effective for controlling the power operation of the clutch operating means, and a clutch controlled device for preventing shifting of the gears until the clutch is disengaged.

30. In a gear shift mechanism, the combination of a variable gear shift, power means for operating the gear shift including a movable motor member, means controlling the power operation of the gear shift operating means for operating the gear shift to effect selective speed changes, a clutch, power means for operating the clutch, a control device for controlling the power operation of the clutch operating means, a power cut off and let on device movable in the movement of said movable motor member in gear shift changes from intermediate to high gear and high gear to intermediate gear for respectively throwing the clutch operating means into and out of action and rendering the clutch power control device ineffective and effective for controlling the power operation of the clutch, an accelerator, an acelerator operated means for actuating said control device, and an emergency control device operable when the gear shift is in high gear to arbitrarily control the power operation of the gear shift for a shift from high gear to intermediate gear and to simultaneously effect movement of the power cut off and let on device to let on position so as to render the clutch power control device effective for controlling the power operation of the clutch.

31. In a gear shift mechanism, the combination of a variable gear shift, power means for operating the gear shift, a clutch, power means for operating the clutch, a device for controlling the power operation of the clutch operating means, a clutch element controlled device operative to prevent operation of the gear shift when the clutch is engaged, a throw-out device operated by a moving part of the gear shift for preventing disengagement of the clutch by operation of its power control device when the gear shift is in high gear, and means operative when said clutch element controlled device and throw-out device are in action for the purposes set forth to effect a power operation of the gear shift operating means for a shift action from high gear to a lower gear and to effect a power operation of the clutch operating means to disengage the clutch during such gear shift change.

32. A fluid pressure operated gear shifter comprising selector valve elements for controlling the operation of the gear shifter, manually controlled means for governing one of the valve elements, speed controlled means for governing the other of said valve elements, and manually controlled means independent of the speed controlled means for governing the speed controlled valve element.

33. In a vehicle driving mechanism, a power operated gear shift, a clutch, a vehicle movement controlled device governing the power operation of the gear shift for effecting speed changes, means for limiting the movement of said device to intermediate speed position in a speed accelerating action, and clutch controlled means for rendering said limiting means ineffective and permitting movement of said device to a higher speed position on actuation of the clutch.

34. In a vehicle driving mechanism, a power operated gear shift, means controlling the power operation of the gear shift for effecting different speed shifts including a vehicle movement governed device shiftable to positions for effecting intermediate and high speed shifts at vehicle speeds above a predetermined vehicle speed, and clutch controlled means acting while the clutch is engaged for maintaining said device in one or the other of said positions to which it has been moved regardless of the vehicle speed and permitting movement of said device for a shift change when the clutch is disengaged.

35. A power operated variable gear shifter having a clutch and power control means governing the power actuation of the gear shifter for different shift changes, said control means including vehicle movement influenced means for effecting intermediate and high speed shifts at vehicle speeds above a predetermined speed, and means controlled by clutch actions for restraining said vehicle movement influenced means from action for effecting a change of shift under change influencing vehicle speeds while the clutch is engaged and relieving said means from such restraint when the clutch is disengaged.

36. A power operated variable gear shifter having a clutch and power control means governing the power actuation of the gear shifter for different shift changes, said control means including vehicle movement influenced means shiftable to positions for effecting intermediate and high speed shifts at vehicle speeds above a predetermined speed, and means controlled by clutch actions for preventing shift of said means from one of its positions to another when the clutch is engaged and permitting such shift when the clutch is disengaged.

37. Speed change mechanism for motor driven vehicles having speed accelerating and decelerating means and a clutch for connecting the speed change mechanism with and disconnecting it from the driving motor, power mechanism embodying controlling means operatively controlling the speed change mechanism for effecting different speed changes on successive declutching actions accompanied by acceleration, said controlling means including means governed by vehicle movement as to positions for controlling the power mechanism to effect intermediate and high speed shift changes at predetermined vehicle speeds, said means being inoperative while the clutch is engaged in either of such shift controlling positions regardless of the vehicle speed for effecting a change from a shift change previously effected at one of the predetermined speeds to a shift change suitable for the other predetermined speed, but rendered operative for effecting such shift changes at the proper predetermined speeds by declutching actions.

38. In a vehicle driving mechanism, a gear shift, a fluid pressure operated power means for actuating the gear shift, speed controlled valve means governing the fluid pressure operation of the gear shift power means for effecting normal gear shift actions at different vehicle speeds, and clutch controlled means for controlling the fluid pressure operation of the gear shift power means independent of the speed controlled means for effecting a selective shift of the gearing from one gear ratio to another.

39. In a vehicle driving mechanism, a gear shift, fluid pressure operated power means for actuating the same, a speed controlled means governing the fluid pressure operation of the power means for operating the gear shift to effect normal gear shift actions at different vehicle speeds, and means for controlling the fluid pressure operation of the gear shift power means independent of the speed controlled means for operating the gear shift to effect a shift to one of a plurality of relatively accelerated or decelerated gear ratios when the speed controlled means is in other than low speed position and the vehicle is running at a speed suitable for high speed shift.

40. In a vehicle driving mechanism, a power operated stepped ratio transmission having several ratios, fluid pressure operated gear shifting means operating thereon, a clutch, means controlled by vehicle speed for controlling power operation of the shifting means, means for limiting the controlled means to a predetermined speed position upon vehicle acceleration, and clutch controlled means for releasing the limiting means to permit movement of the controlled means to another speed position.

41. In a vehicle driving mechanism, a stepped ratio transmission having several ratios, fluid pressure operated shifting means operating thereon, control means therefor and a clutch, said control means including a selector, means for moving the selector in a predetermined manner as the vehicle is accelerated, means for limiting the selector to an intermediate position, and means operated by the clutch for rendering the limiting means ineffective.

42. In a vehicle driving mechanism, a stepped ratio transmission having several ratios, fluid pressure operated shifting means operating thereon, control means therefor, and a clutch, said control means including a fluid pressure controlling selector, means for moving the selector in a predetermined manner as the vehicle is accelerated to shift the transmission to successive ratios in a predetermined order, means for limiting the selector to an intermediate position, and means operated by the clutch for rendering the limiting means ineffective.

43. In a vehicle driving mechanism, a stepped ratio transmission having several ratios, fluid pressure operated shifting means operating thereon, control means therefor, and a clutch, said control means including vehicle speed controlled selector means for controlling the fluid pressure operation of the shifting means and the shift effected by said control means, means for varying the control to effect a shift other than one effected by the said selector means, and clutch released means for controlling the selector means in certain of its positions.

44. In a vehicle driving mechanism, a gear shift, fluid pressure power means for operating the same, valve means controlled by movement of the vehicle for governing the operation of the power means for operating the gear shift to effect normal gear shift actions at different vehicle speeds, and manually operable control devices shiftable independently of said valve means for controlling the fluid pressure operation of the power means for operating the gear shift to effect a shift to one or the other of two gear ratios varying from that determinable at the time by the governing action of the speed controlled means.

ANTHONY C. VELO.